United States Patent
Kachmar (10) Patent No.: US 9,678,290 B2
(45) Date of Patent: Jun. 13, 2017

(54) FIBER OPTIC CABLE ASSEMBLY INCLUDING A CONNECTOR ASSEMBLY

(71) Applicant: CommScope Technologies LLC, Hickory, NC (US)

(72) Inventor: Wayne M. Kachmar, North Bennington, VT (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 14/726,954

(22) Filed: Jun. 1, 2015

(65) Prior Publication Data

US 2016/0085040 A1 Mar. 24, 2016

Related U.S. Application Data

(63) Continuation of application No. 13/784,044, filed on Mar. 4, 2013, now Pat. No. 9,046,658, which is a continuation of application No. 12/472,802, filed on May 27, 2009, now Pat. No. 8,391,658.

(60) Provisional application No. 61/056,462, filed on May 28, 2008.

(51) Int. Cl.
*G02B 6/38* (2006.01)
*G02B 6/44* (2006.01)
(Continued)

(52) U.S. Cl.
CPC ........ *G02B 6/4432* (2013.01); *B29D 11/0075* (2013.01); *B29D 11/00663* (2013.01);
(Continued)

(58) Field of Classification Search
CPC .......... G02B 6/44; G02B 6/36; G02B 6/3889; G02B 6/4432; B29D 11/0075
(Continued)

(56) References Cited

U.S. PATENT DOCUMENTS 3,991,014 A   11/1976   Kleinschuster
4,045,121 A    8/1977   Clark
(Continued)

FOREIGN PATENT DOCUMENTS

DE    196 08 723 A1    9/1997
EP      0 106 548 A1    4/1984
(Continued)

OTHER PUBLICATIONS

European Search Report for Application No. 09767352.9 mailed Apr. 24, 2014.
(Continued)

*Primary Examiner* — Akm Enayet Ullah
(74) *Attorney, Agent, or Firm* — Merchant & Gould P.C.

(57) ABSTRACT

A fiber optic cable assembly includes a fiber optic cable and a connector assembly. The fiber optic cable includes an optical fiber, having a core surrounded by a cladding, and a jacket, which surrounds the optical fiber. The jacket includes a plurality of reinforcement members integrated into a matrix material of the jacket. The connector assembly includes a rear housing having a connector end that is directly engaged with an end portion of the jacket. A fiber optic cable includes an optical fiber with a core surrounded by a cladding. The fiber optic cable also includes a jacket that surrounds the optical fiber. The jacket includes about 40% to about 70% by weight of a plurality of reinforcement members integrated into a matrix material of the jacket.

8 Claims, 6 Drawing Sheets

(51) Int. Cl.
*B29D 11/00* (2006.01)
*G02B 6/36* (2006.01)

(52) U.S. Cl.
CPC .............. *G02B 6/36* (2013.01); *G02B 6/3889* (2013.01); *G02B 6/4486* (2013.01)

(58) Field of Classification Search
USPC ....... 385/100, 102, 103, 104, 105, 106, 107, 385/108, 109, 110, 111, 112, 113, 114, 385/147
See application file for complete search history.

(56) References Cited

U.S. PATENT DOCUMENTS

| | | | |
|---|---|---|---|
| 4,047,797 A | 9/1977 | Arnold et al. | |
| 4,067,852 A | 1/1978 | Calundann | |
| 4,078,853 A | 3/1978 | Kempf et al. | |
| 4,083,829 A | 4/1978 | Calundann et al. | |
| 4,130,545 A | 12/1978 | Calundann | |
| 4,161,470 A | 7/1979 | Calundann | |
| 4,168,109 A | 9/1979 | Dumire | |
| 4,172,106 A | 10/1979 | Lewis | |
| 4,231,635 A | 11/1980 | Zeidler et al. | |
| 4,312,563 A | 1/1982 | Mead | |
| 4,318,842 A | 3/1982 | East et al. | |
| 4,460,735 A | 7/1984 | Froix | |
| 4,468,364 A | 8/1984 | Ide | |
| 4,550,976 A | 11/1985 | Cooper et al. | |
| 4,553,815 A | 11/1985 | Martin | |
| 4,623,495 A | 11/1986 | Degoix et al. | |
| 4,693,551 A | 9/1987 | Blanco et al. | |
| 4,695,124 A | 9/1987 | Himono et al. | |
| 4,723,831 A | 2/1988 | Johnson et al. | |
| 4,728,698 A | 3/1988 | Isayev et al. | |
| 4,730,894 A | 3/1988 | Arroyo | |
| 4,733,934 A | 3/1988 | Wais et al. | |
| 4,765,712 A | 8/1988 | Bohannon, Jr. et al. | |
| 4,767,183 A | 8/1988 | Martin | |
| 4,769,286 A | 9/1988 | Le Noane | |
| 4,778,244 A | 10/1988 | Ryan | |
| 4,781,433 A | 11/1988 | Arroyo et al. | |
| 4,798,443 A | 1/1989 | Knipe et al. | |
| 4,810,834 A | 3/1989 | Grögl et al. | |
| 4,826,278 A | 5/1989 | Gartside, III et al. | |
| 4,835,047 A | 5/1989 | Isayev et al. | |
| 4,844,575 A | 7/1989 | Kinard et al. | |
| 4,869,573 A | 9/1989 | Radage et al. | |
| 4,875,757 A | 10/1989 | Greveling | |
| 4,906,066 A | 3/1990 | Ryan | |
| 4,920,366 A | 4/1990 | Bowen et al. | |
| 4,956,039 A | 9/1990 | Olesen et al. | |
| RE33,459 E | 11/1990 | Bohannon, Jr. et al. | |
| 5,006,402 A | 4/1991 | Isayev | |
| 5,006,403 A | 4/1991 | Isayev | |
| 5,021,475 A | 6/1991 | Isayev | |
| 5,032,433 A | 7/1991 | Isayev et al. | |
| 5,050,957 A | 9/1991 | Hamilton et al. | |
| 5,058,983 A | 10/1991 | Corke et al. | |
| 5,070,157 A | 12/1991 | Isayev et al. | |
| 5,073,043 A | 12/1991 | DiMarco et al. | |
| 5,082,338 A | 1/1992 | Hodge | |
| 5,082,348 A | 1/1992 | Gartside, III et al. | |
| 5,098,177 A | 3/1992 | Tanaka | |
| 5,113,468 A | 5/1992 | Baker | |
| 5,121,458 A * | 6/1992 | Nilsson | G02B 6/4472 385/100 |
| 5,125,060 A * | 6/1992 | Edmundson | G02B 6/2804 385/100 |
| 5,148,509 A | 9/1992 | Kannabiran | |
| 5,202,949 A | 4/1993 | Hileman et al. | |
| 5,224,187 A | 6/1993 | Davidson | |
| 5,238,638 A | 8/1993 | Isayev | |
| 5,253,315 A | 10/1993 | Fentress | |
| 5,260,380 A | 11/1993 | Isayev | |
| 5,268,225 A | 12/1993 | Isayev | |
| 5,275,877 A | 1/1994 | Isayev | |
| 5,293,582 A | 3/1994 | Beard et al. | |
| 5,307,843 A | 5/1994 | Jarrin et al. | |
| 5,320,788 A | 6/1994 | Schneider et al. | |
| 5,360,497 A | 11/1994 | Schneider et al. | |
| 5,389,012 A | 2/1995 | Huang | |
| 5,561,729 A * | 10/1996 | Parris | G02B 6/4432 385/100 |
| 5,767,198 A | 6/1998 | Shimizu et al. | |
| 5,838,864 A | 11/1998 | Patel et al. | |
| 5,892,871 A | 4/1999 | Dahan et al. | |
| 5,932,149 A | 8/1999 | Schneider | |
| 5,943,460 A | 8/1999 | Mead et al. | |
| 6,019,635 A | 2/2000 | Nelson | |
| 6,137,936 A | 10/2000 | Fitz et al. | |
| 6,198,865 B1 | 3/2001 | Risch | |
| 6,293,824 B1 | 9/2001 | Guerin et al. | |
| 6,324,324 B1 | 11/2001 | Dixon et al. | |
| 6,400,873 B1 * | 6/2002 | Gimblet | H01S 3/2383 372/6 |
| 6,419,402 B1 * | 7/2002 | Zimmel | G02B 6/3869 385/86 |
| 6,459,837 B1 | 10/2002 | Fitz et al. | |
| 6,495,764 B1 | 12/2002 | Hori | |
| 6,527,986 B2 | 3/2003 | Blyler, Jr. et al. | |
| 6,576,166 B1 | 6/2003 | Perrin et al. | |
| 6,654,527 B2 | 11/2003 | Sakabe et al. | |
| 6,660,182 B2 | 12/2003 | Jester | |
| 6,801,695 B2 * | 10/2004 | Lanier | G02B 6/4486 385/100 |
| 6,840,803 B2 | 1/2005 | Wlos et al. | |
| 7,010,201 B2 | 3/2006 | Risch | |
| 7,011,774 B2 | 3/2006 | Risch | |
| 7,144,272 B1 | 12/2006 | Burris et al. | |
| 7,379,642 B2 | 5/2008 | Kachmar | |
| 7,413,466 B2 | 8/2008 | Clark et al. | |
| 7,537,393 B2 | 5/2009 | Anderson et al. | |
| 8,391,658 B2 | 3/2013 | Kachmar | |
| 9,046,658 B2 | 6/2015 | Kachmar | |
| 2002/0025127 A1 * | 2/2002 | Graham | B29C 47/0014 385/102 |
| 2002/0146563 A1 | 10/2002 | Risch | |
| 2003/0091307 A1 | 5/2003 | Hurley et al. | |
| 2003/0118296 A1 | 6/2003 | Smith | |
| 2004/0096166 A1 * | 5/2004 | Rossi | G02B 6/4438 385/100 |
| 2004/0105636 A1 | 6/2004 | Cottevieille et al. | |
| 2004/0238979 A1 | 12/2004 | Yamano et al. | |
| 2005/0147363 A1 | 7/2005 | Chastain et al. | |
| 2006/0159407 A1 | 7/2006 | Kachmar | |
| 2006/0269198 A1 | 11/2006 | Blazer et al. | |
| 2008/0292254 A1 | 11/2008 | Kachmar | |

FOREIGN PATENT DOCUMENTS

| | | |
|---|---|---|
| EP | 0 126 428 | 11/1984 |
| GB | 1 486 227 | 9/1977 |
| GB | 1 568 178 | 5/1980 |
| GB | 2 140 930 | 12/1984 |
| JP | 57-78505 | 5/1982 |
| JP | 57-186708 | 11/1982 |
| JP | 62-211608 | 9/1987 |
| JP | 09-080276 | 3/1997 |
| JP | 11-060286 | 3/1999 |
| JP | 2006-276608 | 10/2006 |

OTHER PUBLICATIONS

International Search Report and Written Opinion mailed Jan. 5, 2010.

* cited by examiner

FIBER OPTIC CABLE ASSEMBLY INCLUDING A CONNECTOR ASSEMBLY

CROSS-REFERENCE TO RELATED APPLICATIONS

This application is a continuation of application Ser. No. 13/784,044, filed Mar. 4, 2013, now U.S. Pat. No. 9,046,658, which is a continuation of application Ser. No. 12/472,802, filed May 27, 2009, now U.S. Pat. No. 8,391,658, which application claims the benefit of provisional application Ser. No. 61/056,462, filed May 28, 2008, which applications are incorporated herein by reference in their entirety.

TECHNICAL FIELD

The present invention relates to fiber optic cables, and more particularly, to fiber optic cables adapted for connectorization.

BACKGROUND

Fiber optic cables are widely used to transmit light signals for high speed data transmission. A fiber optic cable typically includes: (1) an optical fiber or optical fibers; (2) a buffer or buffers that surrounds the fiber or fibers; (3) a strength layer that surrounds the buffer or buffers; and (4) a jacket. Optical fibers function to carry optical signals. A typical optical fiber includes a core surrounded by a cladding that is covered by a protective coating or coatings. Buffer layers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Jackets provide protection against damage caused by crushing, abrasions, and other physical damage. Jackets also provide protection against chemical damage (e.g., ozone, alkali, acids).

Fiber optic cable assemblies typically include fiber optic connectors. In prior art fiber optic cable assemblies, fiber optic connectors are usually directly engaged to the strength layer. However, as strength layers typically include aramid yarn, these layers can be difficult with which to work. In particular, the strength layers can be difficult to cut and often require special cutting tools.

SUMMARY

An aspect of the disclosure relates to a fiber optic cable assembly having a fiber optic cable and a connector assembly. The fiber optic cable includes an optical fiber, having a core surrounded by a cladding, and a jacket, which surrounds the optical fiber. The jacket includes a plurality of reinforcement members integrated into a matrix material of the jacket. The connector assembly includes a rear housing having a connector end that is directly engaged with an end portion of the jacket.

Another aspect of the disclosure relates to a fiber optic cable having an optical fiber with a core surrounded by a cladding. The fiber optic cable also includes a jacket that surrounds the optical fiber. The jacket includes about 40% to about 70% by weight of a plurality of reinforcement members integrated into a matrix material of the jacket. In one embodiment, the jacket also includes an end portion, the outer surface of which includes a texturized gripping surface.

Another aspect of the disclosure relates to a method of manufacturing a fiber optic cable. In this method, a matrix material and a plurality of reinforcement members are mixed in an extruder. The mixture is extruded through an annular extrusion passage of an extrusion die to form a jacket. An end portion of the jacket is texturized.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
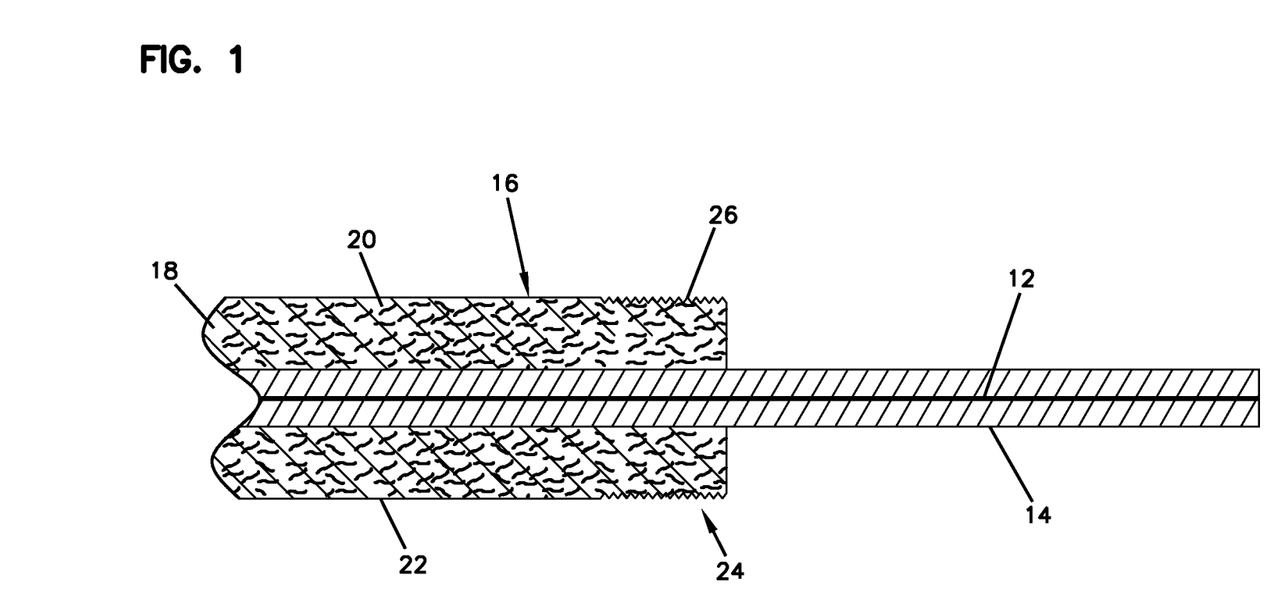
FIG. 1 is a cross-sectional view of a fiber optic cable having features that are examples of aspects in accordance with the principles of the present disclosure.

Referring now to FIG. 1, a fiber optic cable, generally designated 10, is shown. The fiber optic cable 10 includes at least one optical fiber 12, a buffer layer 14, and a jacket, generally designated 16.

The optical fiber 12 carries optical signals through the fiber optic cable 10. Typically, the optical fiber 12 includes a core, which is the light-conducting central portion of the optical fiber 12, and a cladding. The cladding surrounds the core and is typically composed of a silica-based material having a lower index of refraction than the silica-based material of the core. Light is internally reflected within the core to transmit the optical signal along the core. In addition to the core and cladding, the optical fiber usually includes one or more protective acrylate polymer coatings that surround the cladding. Typical outside diameters for the cores of the optical fibers 12 are less than or equal to about 10 µm for a single mode or bend insensitive core (or less than or equal to about 62 µm for multimode core), less than or equal to about 150 µm for the cladding, and less than or equal to about 300 µm for one or more protective coatings.

In the subject embodiment, the buffer layer 14 is depicted as a tight buffer layer that surrounds the optical fiber 12. The buffer layer 14 provides protection of the optical fiber 12. It will be appreciated that the buffer layer 14 can be made of a polymeric material such as polyvinyl choloride (PVC). Other polymeric materials (e.g., polyethylenes, polyurethanes, polypropylenes, polyvinylidene fluorides, ethylene vinyl acetate, nylon, polyester, or other materials) may also be used. Typically, the outer diameter of the buffer layer 14 is less than or equal to about 950 µm. In certain embodiments, however, the fiber optic cable 10 may not include the buffer layer 14.

The jacket 16 includes a matrix material 18 (e.g., polyethylene, polypropylene, ethylene-propylene, copolymers, polystyrene, and styrene copolymers, PVC, polyamide (nylon), flouropolymers, polyesters such as polyethylene terephthalate, polyetheretherketone, polyphenylene sulfide, polyetherimide, polybutylene terephthalate, low smoke zero halogens, polyolefins and polycarbonate, as well as other thermoplastic materials) and a plurality of reinforcement members 20 (e.g., rods, tendrils, extensions, fibers, etc.), such as aramid yarns or amorphous liquid crystal polymers, embedded within the matrix material 18. The reinforcement members 20 are embedded in the jacket 16 to increase the tensile strength of the jacket 16 and to decrease the percent elongation of the jacket 16 when the jacket 16 is subjected to a tensile force. As will be described in greater detail subsequently, in the subject embodiment, the reinforcement members 20 are mixed in with the matrix material 18 prior to the extrusion of the jacket 16. In the preferred embodiment, the reinforcement members 20 make up about 40% to about 70% of the total weight of the jacket 16. In another embodiment, the reinforcement members 20 make up at least about 40% of the total weight of the jacket 16.

Each of the reinforcement members 20 has a length that is less than the total length of the fiber optic cable 10. In certain embodiments, the lengths of the reinforcement members 20 are less than or equal to 3.2 mm, while the diameter of the reinforcement members 20 is less than or equal to 100 µm.

In another embodiment, the volume of reinforcement members 20 in the matrix material 18 and dimensions of the reinforcement members 20 are such that the elongation of the jacket 16 is less than 3% when the jacket is subjected to a 26 lb. tensile force. In another embodiment, the volume of reinforcement members 20 in the matrix material 18 and dimensions of the reinforcement members 20 are such that the elongation of the jacket 16 is less than 2% when the jacket is subjected to a 26 lb. tensile force. In another embodiment, the volume of reinforcement members 20 in the matrix material 18 and dimensions of the reinforcement members 20 are such that the elongation of the jacket 16 is less than 1% when the jacket is subjected to a 26 lb. tensile force. The reinforcement members 20 are evenly distributed in the matrix material 18 of the jacket 16. While the orientation of the reinforcement members 20 prior to extrusion is generally random, during the extrusion process, the reinforcement members 20 have lengths generally aligned with the longitudinal axis of the fiber optic cable 10.

Referring still to FIG. 1, the jacket 16 further includes an outer surface 22 having an end portion, generally designated 24. In the subject embodiment, the end portion 24 of the outer surface 22 includes a texturized surface 26 (e.g., bumps, projections, ridges, surface irregularities, etc.). In one embodiment, the texturized surface 26 is a knurled surface. In another embodiment, the texturized surface 26 is a plurality of external threads.

Figure 2:
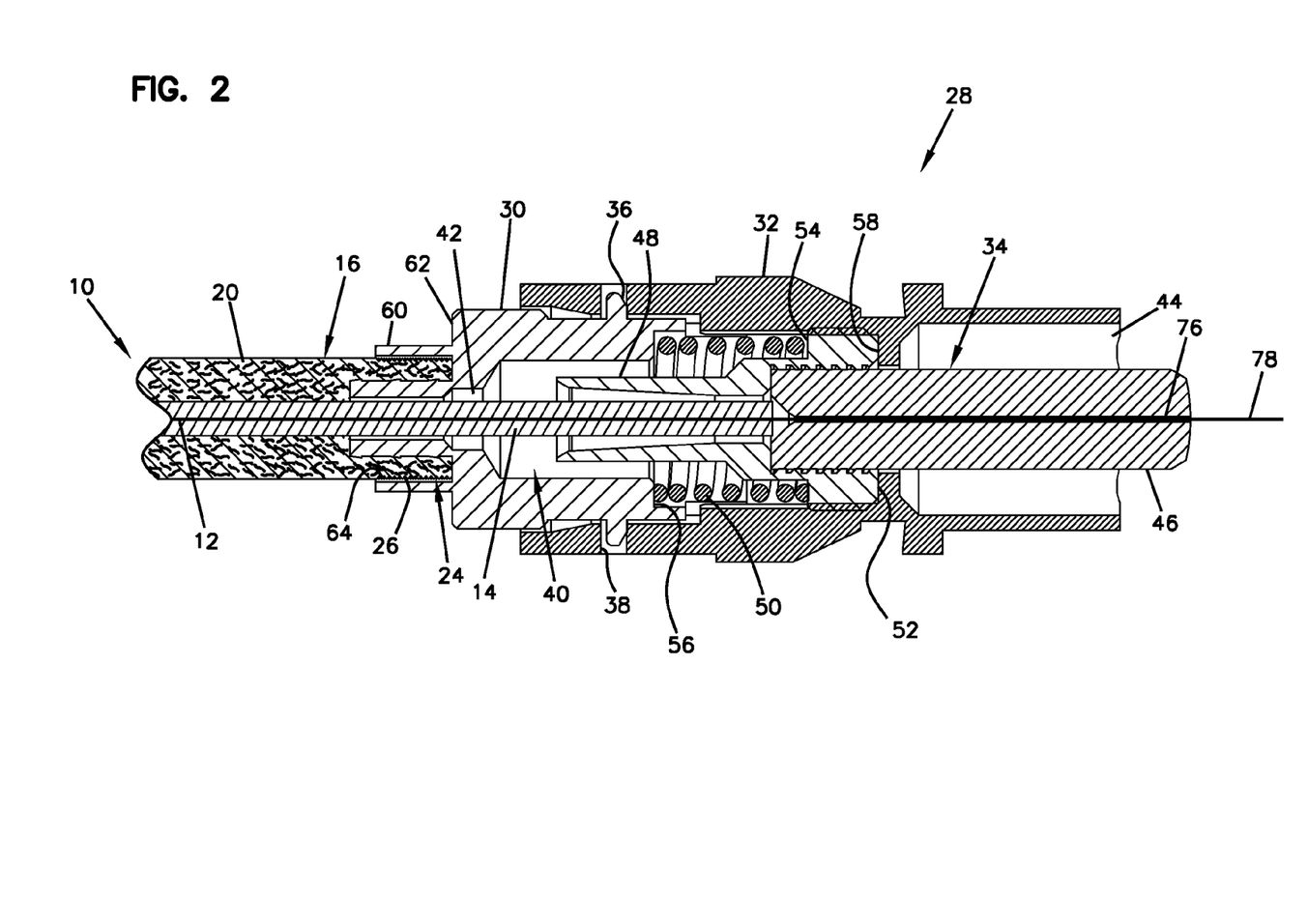
FIG. 2 is a cross-sectional view of a connector assembly engaged with the fiber optic cable of FIG. 1.

Referring now to FIG. 2, the fiber optic cable 10 is shown with a connector assembly, generally designated 28, attached to the end portion 24 of the fiber optic cable 10. In the subject embodiment, the connector assembly 28 includes a rear housing 30, a front housing 32, and a ferrule assembly, generally designated 34. The rear housing 30 is held in snap-fit engagement with the front housing 32 by a plurality of tabs 36 defined by the rear housing 30 and corresponding recesses 38 defined by the front housing 32. The rear housing 30 and the front housing 32 cooperate to define a central passageway 40, which includes a proximal portion 42 and a distal portion 44.

The ferrule assembly 34 of the connector assembly 28 is disposed in the central passageway 40 of the connector assembly 28. The ferrule assembly 34 includes a ferrule 46 (e.g., a ceramic ferrule), a ferrule holder 48, which is mounted on the ferrule 46, and a spring 50. The ferrule holder 48 includes an end surface 52 and a shoulder 54. In the connector assembly 28, the spring 50 is disposed between the shoulder 54 of the ferrule holder 48 and a spring surface 56 defined by the rear housing 30. With the spring 50 disposed between the ferrule holder 48 and the rear housing 30, the spring 50 biases the ferrule 46 toward the distal portion 44 of the central passageway 40. The ferrule holder 48 is retained in the connector assembly 28 by the abutment of the end surface 52 and a rim 58 defined by the front housing 32.

Referring still to FIG. 2, the rear housing 30 of the connector assembly 28 includes a connector end 60, which protrudes from an end surface 62 of the rear housing 30. The connector end 60 defines an inner cavity 64 that is adapted to receive the jacket 16 of the fiber optic cable 10. In the depicted embodiment of FIG. 2, the connector end 60 is made up of a thin wall of material (e.g., copper, etc.) that is generally cylindrical in shape. The thin wall of the connector end 60 allows for the connector end 60 to be easily deformed as will be described in more detail subsequently.

Figure 3:
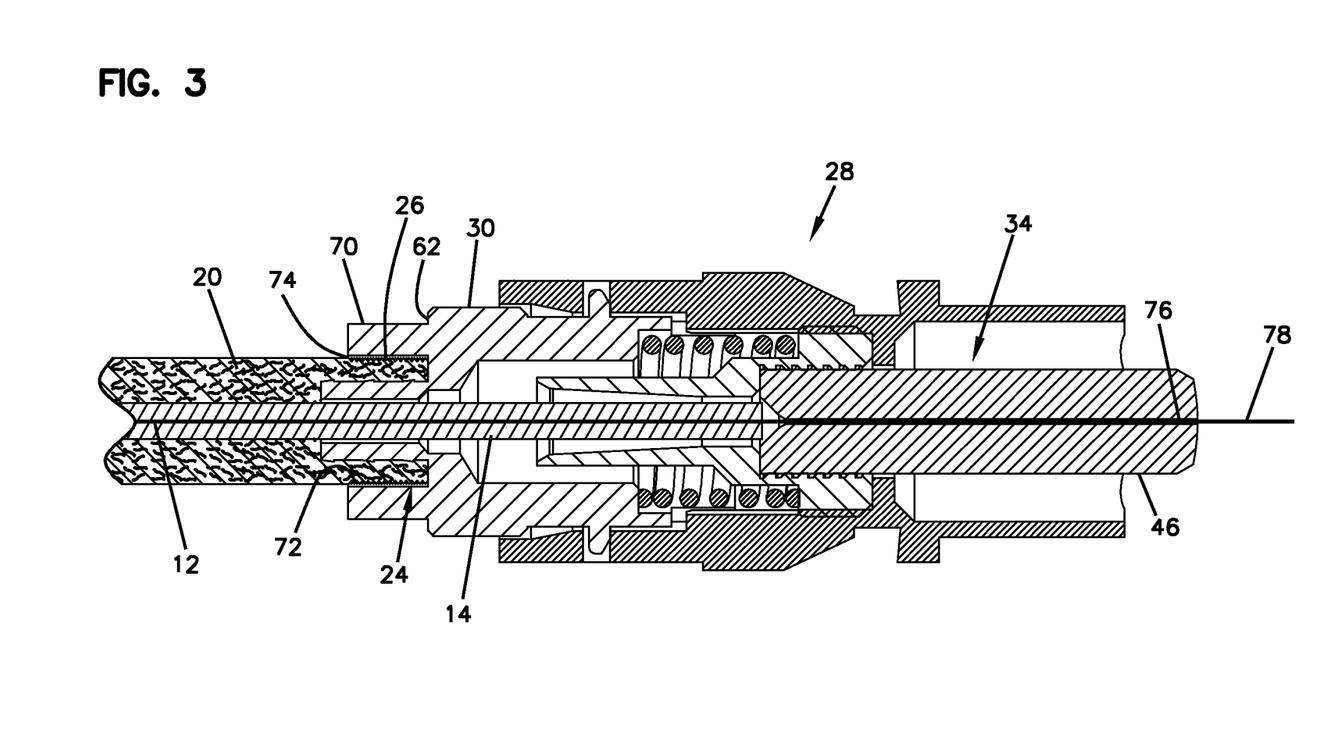
FIG. 3 is a cross-section view of an alternate embodiment of a connector assembly engage with the fiber optic cable of FIG. 1.

Referring now to FIG. 3, an alternate embodiment of the connector assembly 28 is shown. In this alternate embodiment, a connector end portion 70 protrudes from the end surface 62 of the rear housing 30. The connector end portion 70 defines an inner bore 72 having a plurality of internal threads 74. The internal threads 74 of the inner bore 72 are adapted to receive the jacket 16 of the fiber optic cable 10 in threaded engagement.

Referring now to FIGS. 2 and 3, the assembly of the fiber optic cable 10 and the connector assembly 28 will be described. In the subject embodiment, the jacket 16, the buffer layer 14 and the one or more protective coatings of the optical fiber 12 are stripped from the fiber optic cable 10 to expose the optical fiber 12. Epoxy is inserted into a ferrule passage 76 that extends longitudinally through the ferrule 46. With epoxy disposed in the ferrule passage 76, the buffer layer 14 and the optical fiber 12 of the fiber optic cable 10 are inserted through the proximal portion 42 of the central passageway 40 in the rear housing 30 so that the optical fiber 12 extends through the ferrule passageway 76. The fiber optic cable 10 is inserted through the proximal portion 42 until the end portion 24 of the jacket 16 is positioned in the inner cavity 64 of the connector end 60.

With the end portion 24 of the jacket 16 disposed in the inner cavity 64 of the connector end 60, the connector assembly 28 is secured to the jacket 16. In one embodiment, the connector end 60 is mechanically swaged, crimped, deformed, or tightened directly around the jacket 16 to provide retention of the connector assembly 28 to the fiber optic cable 10. In the subject embodiment, the textured surface 26 assists with this retention by providing a surface with a high coefficient of friction.

In another embodiment, the connector end 60 is ultrasonically welded or ultrasonically swaged to the end portion 24 of the jacket 16 to provide retention of the connector assembly 28 to the fiber optic cable 10. In another embodiment, the connector end 60 is thermally welded to the end portion of the jacket 16. In another embodiment, at least one of the inner cavity 64 of the connector end 60 and the end portion 24 of the jacket 16 has a coating. The coating is used to secure the connector end 60 to the end portion 24 of the jacket 16 through a UV-curing process. In another embodiment, the connector end 60 is over-molded to the end portion 24 of the jacket 16 (e.g., a portion of the rear housing 30 is over-molded to the end portion 24 of the jacket 16). It will be understood, however, that the scope of the present disclosure is not limited to the connector assembly 128 being mechanical swaged, ultrasonically swaged, thermally welded or bonded to the fiber optic cable 110.

With the connector assembly 28 secured to the jacket 16 and with the epoxy in the ferrule passageway 76 cured, an end 78 of the optical fiber 12 that extends beyond the ferrule 46 is cleaved. After the end 78 of the optical fiber 12 is cleaved, the end 78 of the optical fiber 12 is polished.

With the connector end 60 tightly engaged with the textured surface 26 of the end portion 24 of the jacket 16, a significant pull-out force is required to disengage the connector end 60 from the end portion 24 of the jacket 16. By way of example only, with the connector end 60 tightly engaged with the textured surface 26 of the jacket 16, the pull-out force required to disengage the connector assembly 28 from the fiber optic cable 10 would be at least about 26 lbs.

Typically, prior art fiber optic cables include a loose strength layer, such as aramid yarn, disposed between the buffer layer and the jacket. Connector assemblies are typically affixed to the prior art fiber optic cable at the strength layer. However, while this method of affixation performs successfully for many applications, strength layers can be difficult with which to work. In particular, loose aramid yarn strength layers can be difficult to cut given the flexibility of the aramid yarn and the aramid yarn's high resistance to cutting. As stated previously, this high resistance to cutting often requires special tools and can be quite time consuming. In addition, the loose strength layer makes automation of the fiber optic cable manufacturing process difficult as the loose strength layer can be difficult to control during automation.

The present disclosure overcomes these problems by having a fiber optic cable 10 that does not include a separate strength layer. To affix the connector assembly 28 to the fiber optic cable 10, which does not include a separate strength layer, the connector assembly is directly connected to the jacket 16. However, in order to provide an adequate pull-out force yet prevent the jacket 16 from breaking as a result of such force, the reinforcement members 20 are embedded or otherwise integrated into the matrix material 18 of the jacket 16 so as to improve the tensile strength of the jacket 16.

Figure 4:
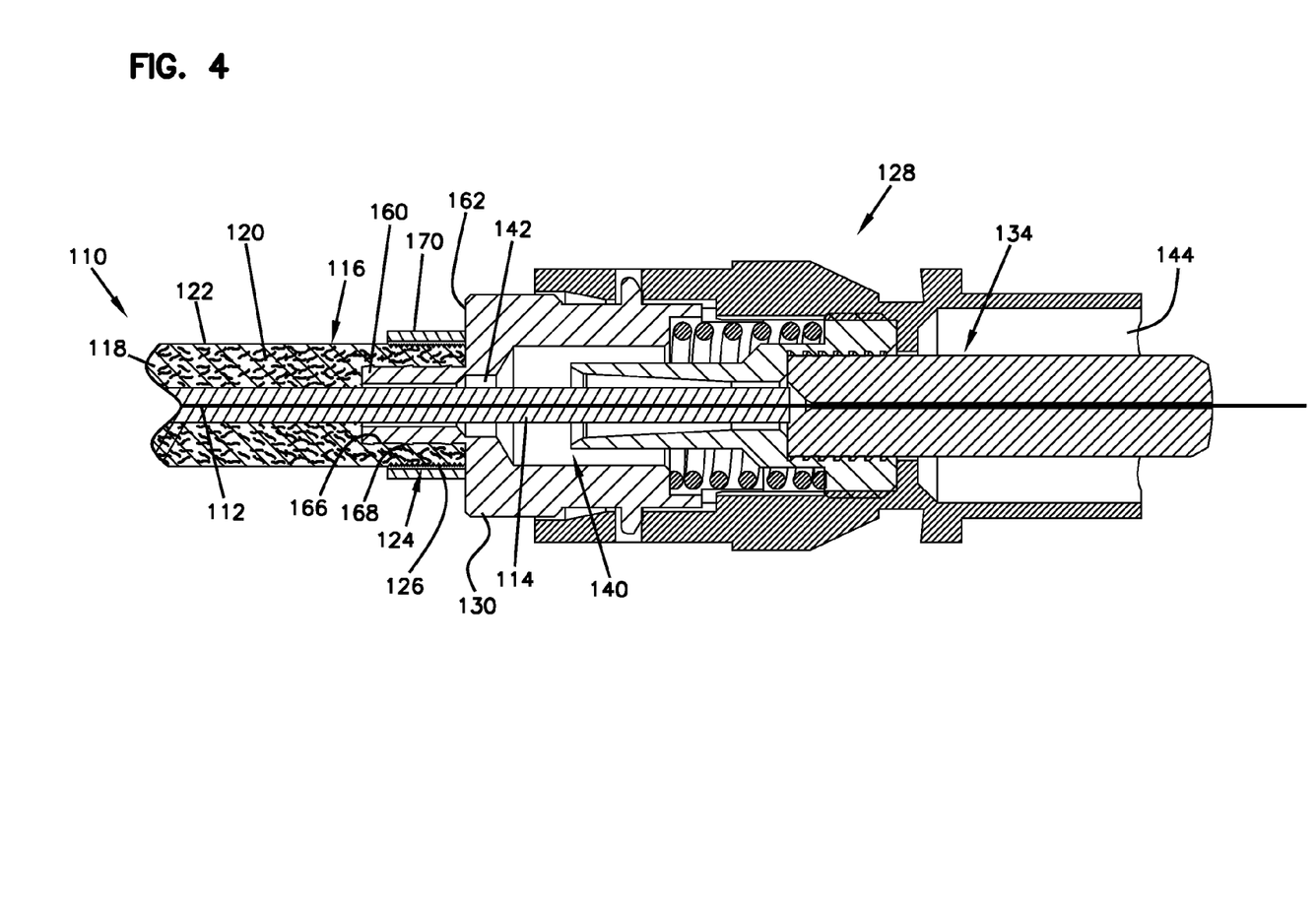
FIG. 4 is a cross-sectional view of an alternate embodiment of a connector assembly and a fiber optic cable having features that are examples of aspects in accordance with the principles of the present disclosure.

Referring now to FIG. 4, an alternate embodiment of a fiber optic cable 110 and a connector assembly 128 is shown. The fiber optic cable 110 includes an optical fiber 112, a buffer layer 114, and a jacket, generally designated 116. The jacket 116 includes a matrix material 118 and a plurality of reinforcement members 120. The jacket 116 further includes an outer surface 122 having an end portion, generally designated 124. The end portion 124 of the outer surface 122 is texturized so as to provide a gripping surface 126 that is coarser than the non-texturized portions of the outer surface 122. The jacket 116 further defines a bore 166 that is disposed in the end portion 124. The bore 166 is adapted to receive a connector end 160 of the connector assembly 128.

The connector assembly 128 includes a rear housing 130, a front housing 132, and a ferrule assembly 134. The connector assembly 128 defines a central passageway 140 having a proximal portion 142 and a distal portion 144. The connector end 160 extends from an end surface 162 of the rear housing 130 of the connector assembly 128. The connector end 160 includes a plurality of flared portions 168 that open toward the distal portion 144 of the central passageway 140. This orientation of the flared portions 168 prevents inadvertent disengagement of the connector end 160 from the bore 166 in the end portion 124 of the jacket 116. As will be described in greater detail subsequently, the flared portions 168 of the connector end 160 of the connector assembly 128 and a crimp 170, which is positioned exterior to the gripping surface 126 of the fiber optic cable 110, provide for the retention of the connector assembly 128 to the end portion 124 of the fiber optic cable 110.

To assemble the connector assembly 128 to the fiber optic cable 110, the crimp 170 is disposed around the gripping surface 126 of the fiber optic cable 110. The connector end 160 is inserted into the bore 166 that is defined by the end portion 124 of the jacket 116. With the connector end 160 disposed in the bore 166 of the jacket 116, the crimp 170 is tightened down around the gripping surface 126 of the jacket 116. The texturization of the gripping surface 126 provides for greater retention of the crimp 170 to the outer surface 122 of the jacket 116 due to the high coefficient of friction of the gripping surface 126. With the crimp 170 tightened to the outer surface 122 of the jacket 116, the jacket 116 is tightened around the connector end 160 and the plurality of flared portions 168. As described previously, the flared portions 168 of the connector end 160 open toward the distal portion 144 of the central passageway 140. With the orientation of the flared portions 168 facing the distal portion 144 of the central passageway 140 and the jacket 116 tightly engaged to the connector end 160, a significant pull-out force is required to disengage the connector end 160 from the end portion 124 of the jacket 116. In addition to the mechanical swaging of the connector assembly 128 to the fiber optic cable 110 as described above, the assembly can also include any one or more of the following: ultrasonic swaging/welding, thermal welding, or bonding. It will be understood, however, that the scope of the present disclosure is not limited to the connector assembly 128 being mechanical swaged, ultrasonically swaged, thermally welded or bonded to the fiber optic cable 110.

Figure 5:
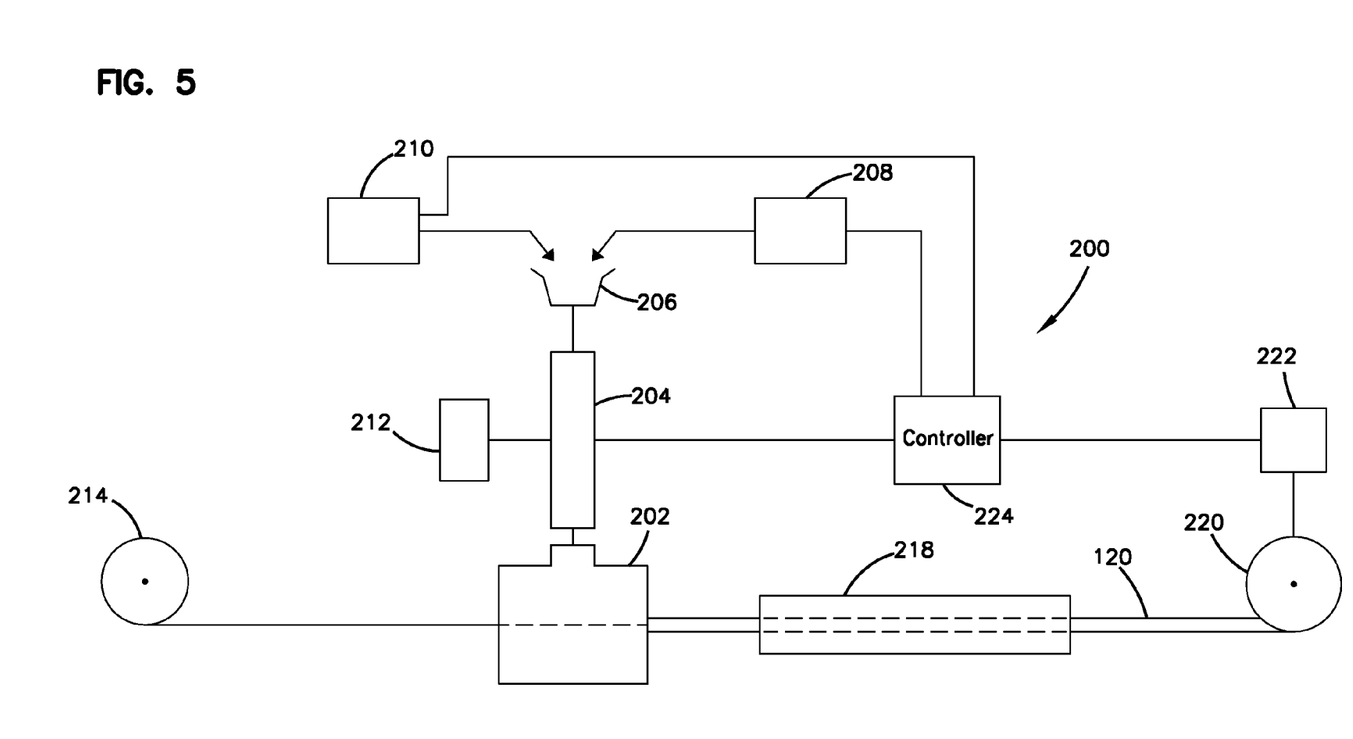
FIG. 5 is a schematic representation of a system for manufacturing the fiber optic cables of FIGS. 1 and 4.

Referring now to FIG. 5, a system 200 for making the fiber optic cable 10 of FIG. 1 is illustrated. The system 200 includes a crosshead, generally designated 202, that receives thermoplastic material from an extruder, generally designated 204. A hopper 206 is used to feed materials into the extruder 204. A first conveyor 208 conveys the matrix material 18 to the hopper 206. A second conveyor 210 conveys the reinforcement members 20 to the hopper 206. The extruder 204 is heated by a heating system 212 that may include one or more heating elements for heating zones of the extruder as well as the crosshead to desired processing temperatures. The optical fiber 12 covered by the buffer layer 14 is fed into the crosshead 202 from a feed roll 214. A water trough 218 is located downstream from the crosshead 202 for cooling the extruded product that exits the crosshead 202. The cooled final product is stored on a take-up roll 220 rotated by a drive mechanism 222. A controller 224 coordinates the operation of the various components of the system 200.

In use of the system 200, the matrix material 18 and the reinforcement members 20 are delivered to the hopper 206 by the first and second conveyors 208, 210, respectively. In certain embodiments, the matrix material 18 and the reinforcement members 20 can be delivered to the hopper 206 in pellet form, and the first and second conveyors 208, 210 can include conveyor belts or screw augers. The controller 224 preferably controls the proportions of the matrix material 18 and the reinforcement members 20 delivered to the hopper 206. In one embodiment, the reinforcement members 20 constitute at least about 40% by weight of the total material delivered to the hopper 206. In another embodiment, the reinforcement members 20 constitute about 40% to about 70% by weight of the total material delivered to the hopper 206.

From the hopper 206, the material moves by gravity into the extruder 204. In the extruder 204, the material is mixed, masticated, and heated. The extruder 204 is heated by the heating system 212. The extruder 204 also functions to convey the material to the crosshead 202, and to provide pressure for forcing the material through the crosshead 202.

If the reinforcement members 20 are liquid crystal polymer, the material is heated to a temperature greater than the melting temperature of the matrix material 18, but less than the melting temperature of the reinforcement members 20. The temperature is preferably sufficiently high to soften the reinforcement members 20 such that the reinforcement members 20 are workable and extrudable.

Figure 6:
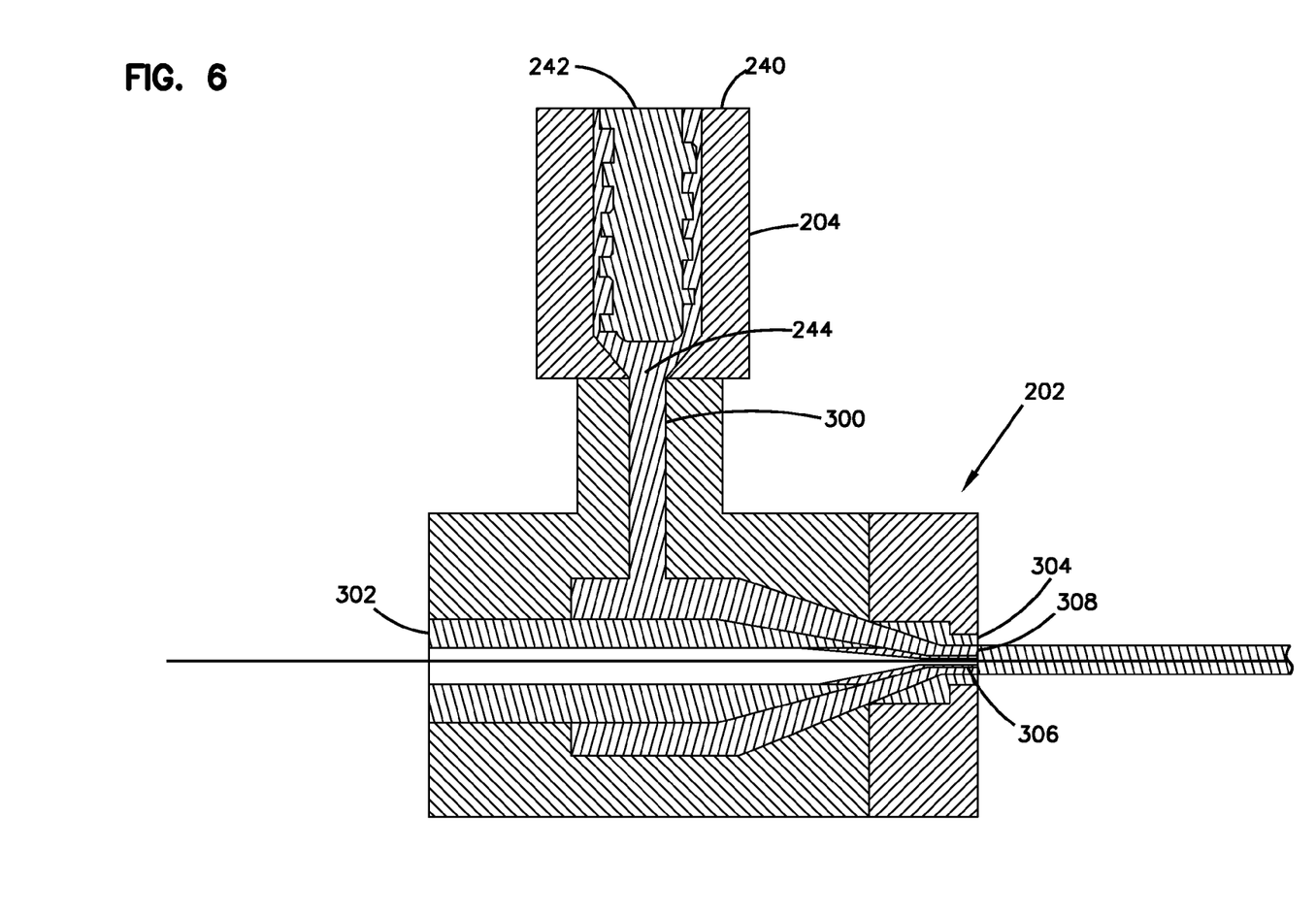
FIG. 6 illustrates a crosshead that can be used with the system of FIG. 5.

Referring now to FIG. 6, the extruder 204 is depicted as including an extruder barrel 240 and an auger/style extruder screw 242 positioned within the extruder barrel 240. An extruder screen 244 can be provided at the exit end of the extruder 204. The extruder screen 244 prevents pieces too large for extrusion from passing from the extruder into the crosshead 202.

The crosshead 202 includes a jacket material input location 300 that receives thermoplastic material from the extruder 204. The crosshead 202 also includes a tip 302 and a die 304. The tip 302 defines an inner passageway 306 through which the optical fiber 12 and buffer layer 14 are fed. The die 304 defines an annular extrusion passage 308 that surrounds the exterior of the tip 302. The crosshead 202 defines an annular passageway for feeding the thermoplastic jacket material to the annular extrusion passage 308. Within the crosshead 202, the flow direction of the thermoplastic material turns 90 degrees relative to the flow direction of the extruder 204 to align with the buffered fiber.

After the fiber optic cable 10 is extruded, the fiber optic cable 10 is then cooled and shape set at the water trough 218. The extrusion process can be a pressure or semi-pressure extrusion process where product leaves the crosshead 202 at the desired shape, or an annular extrusion process where the product is drawn down after extrusion. After cooling, the product is collected on the take-up roller 220.

If the reinforcement members 20 are liquid crystal polymer, it is preferable that the material provided to the crosshead 202 by the extruder 204 be maintained at a temperature greater than the melt temperature of the matrix material 18, but less than the melt temperature of the reinforcement members 20. As the thermoplastic material is extruded through the annular extrusion passage 308, the matrix material 18 and the reinforcement members 20 are stretched. This stretching causes reshaping of the reinforcement members 20 into elongated reinforcement members 20 having lengths generally aligned with the longitudinal axis of the fiber optic cable 10.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A fiber optic cable assembly comprising:
    a fiber optic cable including:
        an optical fiber having a core surrounded by a cladding;
        a jacket surrounding the optical fiber, wherein the jacket includes a plurality of reinforcement members integrated into a matrix material of the jacket;
        wherein the fiber optic cable does not include a separate strength layer;
    a connector assembly including a rear housing having a connector end to which an end portion of an outer surface of the jacket is directly anchored;
    wherein the end portion includes a texturized surface on the outer surface of the end portion that engages the connector end, the texturized surface having a plurality of external threads; and
    wherein the connector end defines a plurality of internal threads that engage the external threads to anchor the outer surface of the end portion to the connector end.

2. A fiber optic cable assembly as claimed in claim 1, wherein the end portion of the jacket defines a bore adapted to receive the connector end of the connector assembly.

3. A fiber optic cable assembly as claimed in claim 2, wherein the connector end includes a plurality of flared portions for retaining the connector end in the bore of the jacket.

4. A fiber optic cable assembly as claimed in claim 3, further comprising a crimp disposed along the texturized surface of the jacket, wherein the texturized surface assists in the retention of the crimp when the crimp is in tight engagement with the jacket.

5. A fiber optic cable assembly as claimed in claim 1, wherein the jacket surrounding the optical fiber includes about 40% to about 70% by weight of the plurality of reinforcement members integrated into the matrix material of the jacket.

6. A fiber optic cable assembly as claimed in claim 1, wherein the reinforcement members are selected from a group consisting of rods, tendrils, extensions, fibers, and combinations thereof.

7. A fiber optic cable assembly as claimed in claim 1, wherein the reinforcement members have lengths less than 3.2 mm and diameters less than 100 μm.

8. A fiber optic cable assembly as claimed in claim 1, wherein a pull-out force required to disengage the connector assembly from the fiber optic cable is at least about twenty-six pounds.

* * * * *